July 25, 1950  A. J. ARENDS  2,516,744
COW TAIL HOLDER
Filed Dec. 14, 1948
Fig. 1.
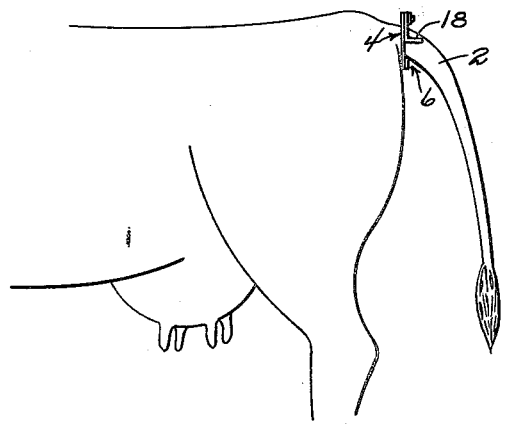
Fig. 2.  Fig. 3.
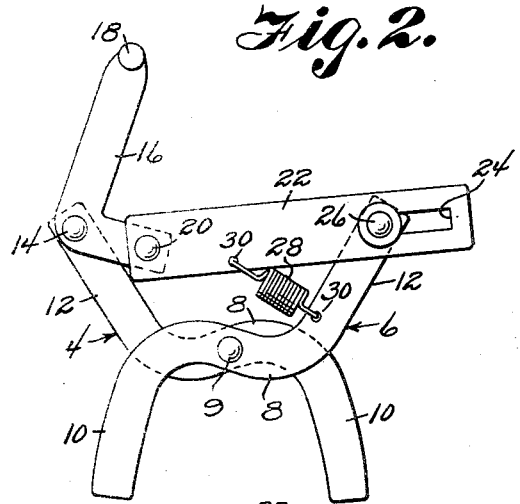 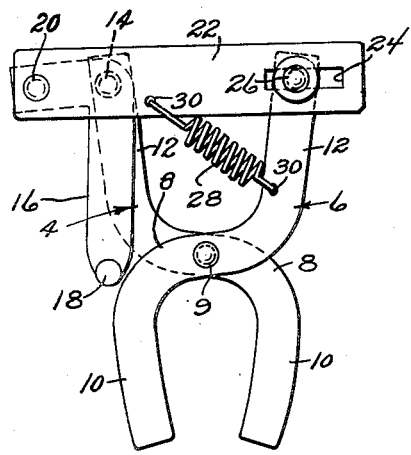
Fig. 4.
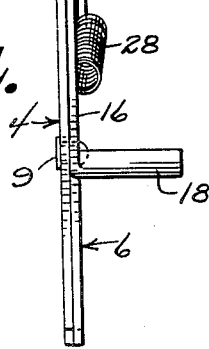
INVENTOR.
Arnold J. Arends
BY Victor J. Evans & Co.
ATTORNEYS Patented July 25, 1950

2,516,744

UNITED STATES PATENT OFFICE 2,516,744

COW TAIL HOLDER

Arnold J. Arends, Monticello, Iowa

Application December 14, 1948, Serial No. 65,127

1 Claim. (Cl. 24—252)

My present invention relates to an improved cow tail holder of the type adapted to clamp painlessly but securely to the tail of a cow near its base for the usual reasons which include the discouragement of the switching of the tail during milking. I have found the holder of my invention superior in results to those presently available, and in addition to discouraging the tail switching, the holder also reduces the tendency of the cow to kick.

In the accompanying drawings I have illustrated one complete example of the physical embodiment of my invention according to the best mode I have thus far devised, but it will be understood that various changes and alterations may be in the exemplified structure without departing from the spirit and scope of the appended claim.

In the drawings:

Figure 1 is a side elevational view of the tail holder of my invention shown in clamped position upon the tail of a cow.

Figure 2 is a front elevational view of the holder unclamped.

Figure 3 is a similar view of the holder in clamped position.

Figure 4 is a side elevational view of the holder as seen in Figure 3.

Referring now to the drawings wherein I have illustrated the present preferred embodiment of my invention, I have shown a portion of a cow and its tail 2 upon which the holder is adapted to be clamped. The holder consists in the two similar clamp arms 4 and 6 each having reverse curves 8 between which the arms are pivotally secured together as at 9.

Each clamp arm has straight extensions 10 and 12 from the outer curve, and the extension 12 of arm 4 is pivotally connected at 14 to the bell crank 16 which has a handle 18.

The short arm of the bell crank is pivoted at 20 to the bar 22 which is slotted near the other end as at 24 to receive the pin 26 passing through the end portion of extension 12 of clamp arm 6.

A coiled spring 28 is shown connected to the bar 22 and the arm 12 through the apertures 30 and tends to pull the pin 26 and the extension 12 of the arm 6 to the left in Figure 2.

Thus with the extensions 10 of the arms 4 and 6 disposed on either side of the tail 2, the bellcrank is swung to the left in Figure 2 to close the extensions on the tail. To compensate for different tail thicknesses however the spring will allow the clamp arm 6 to move relatively of the bar 22 and thereby insure a snug engagement without painful pressure.

The pivot points on the bellcrank are arranged so that they do not align at rest in either clamped or unclamped position with the pin 26 which moves longitudinally only in the bar 22 and thus the holder will remain in either position to which the bellcrank is moved.

Having thus fully described my invention what I claim as new and desire to secure by Letters Patent is:

A cow tail holder comprising a pair of pivotally attached reverse curve clamp arms, straight extension for the arms, a bellcrank pivotally attached to one extension, a connecting bar pivotally secured to the short arm of the bellcrank, a sliding pivotal connection between the other clamp arm and the bar, the center line of the pivot points of the bellcrank at rest being angular to the medial longitudinal line of the bar, a coiled spring connected at the opposite ends of the connecting bar and the latter clamp arm, and a handle on the outer end of the long arm of the bellcrank extended at right angles thereto.

ARNOLD J. ARENDS.

REFERENCES CITED

The following references are of record in the file of this patent:

UNITED STATES PATENTS

| Number | Name | Date |
|---|---|---|
| 103,585 | Donn | May 31, 1870 |
| 207,469 | Wolf | Aug. 27, 1878 |
| 656,755 | Stewart | Aug. 28, 1900 |
| 1,265,817 | Roggenkamp | May 14, 1918 |
| 1,567,155 | Litchfield | Dec. 29, 1925 |
| 2,222,744 | Gallien | Nov. 26, 1940 |
| 2,303,804 | Waid | Dec. 1, 1942 |